July 15, 1952  G. W. SCHATZMAN  2,603,514
FENDER SHIELD ATTACHING MEANS
Filed Oct. 24, 1946  3 Sheets-Sheet 1
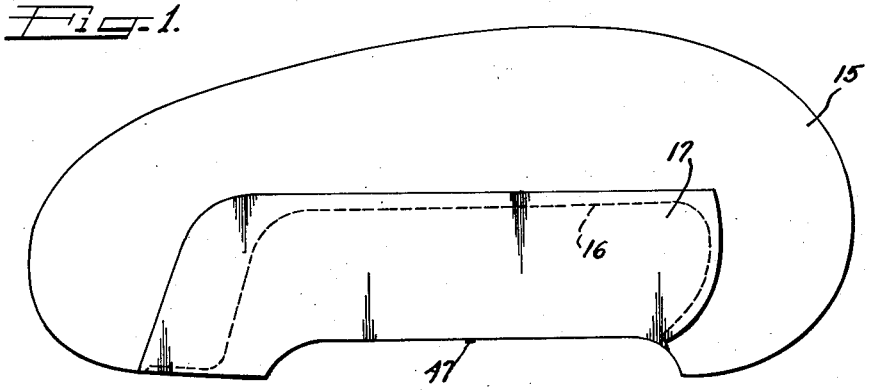
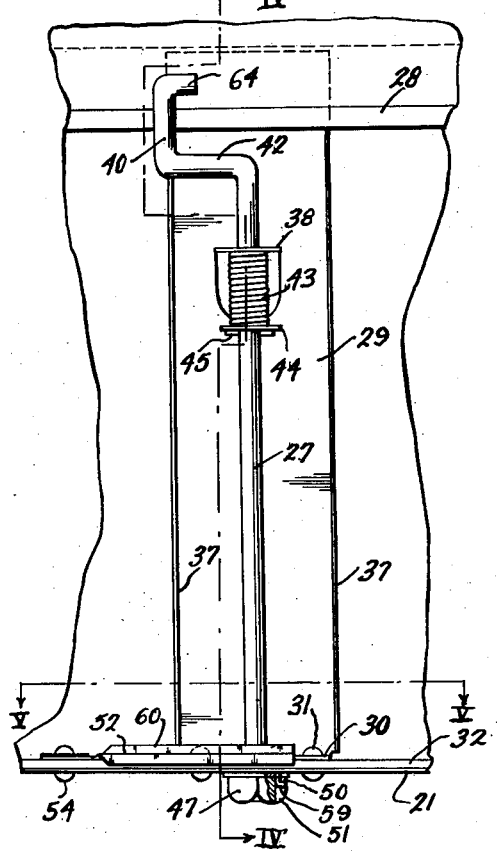
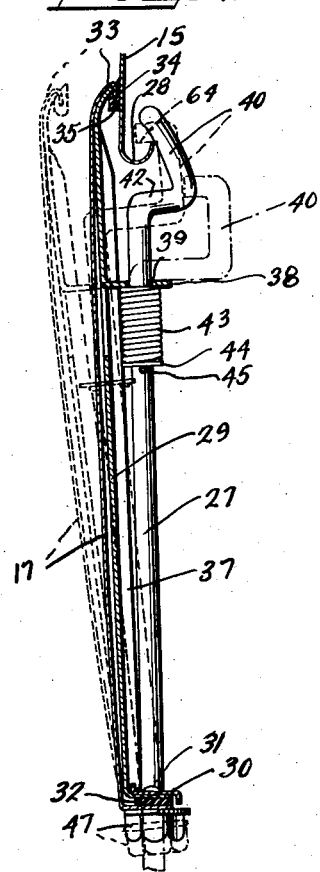
Inventor
GEORGE W. SCHATZMAN

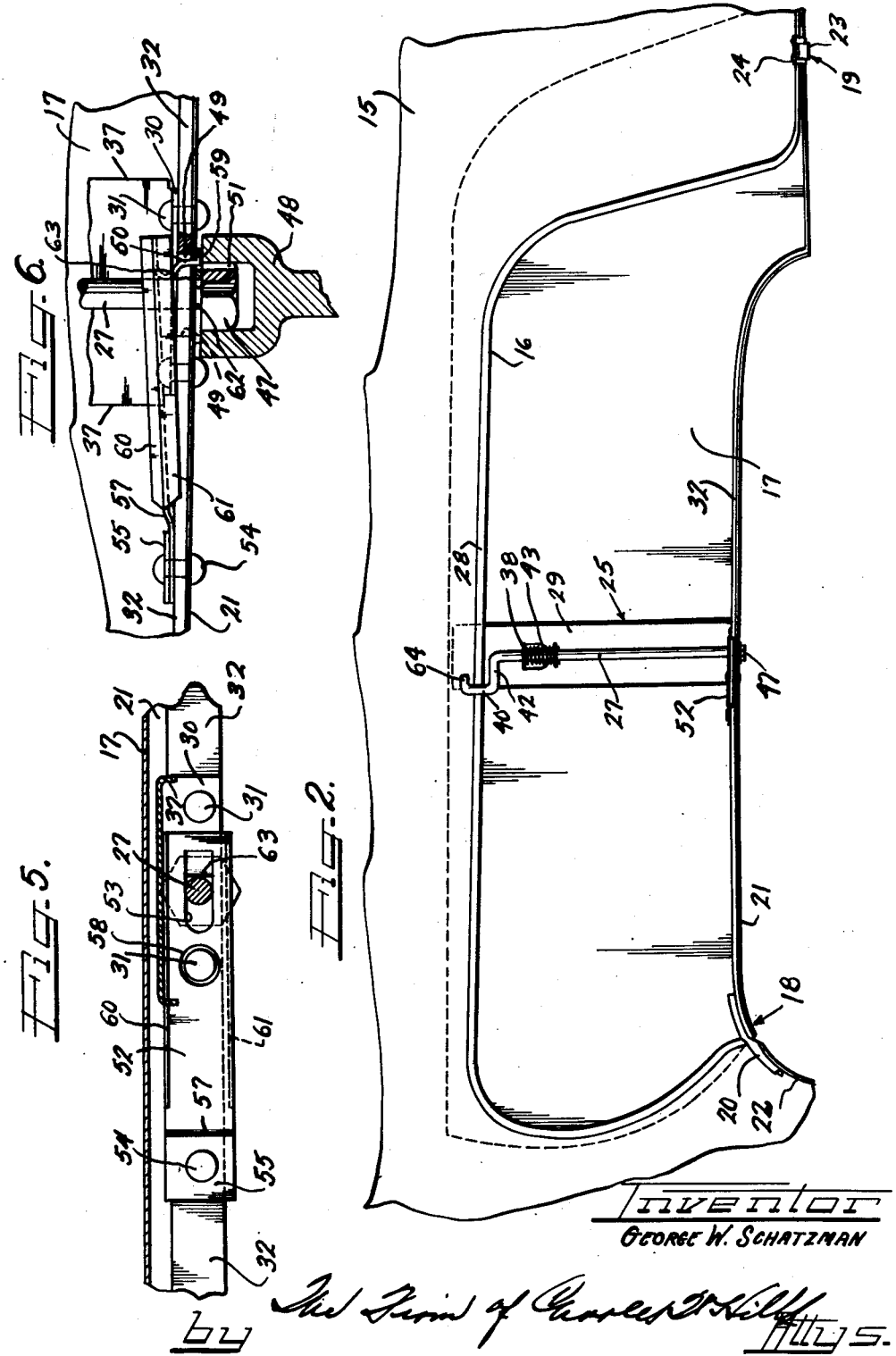

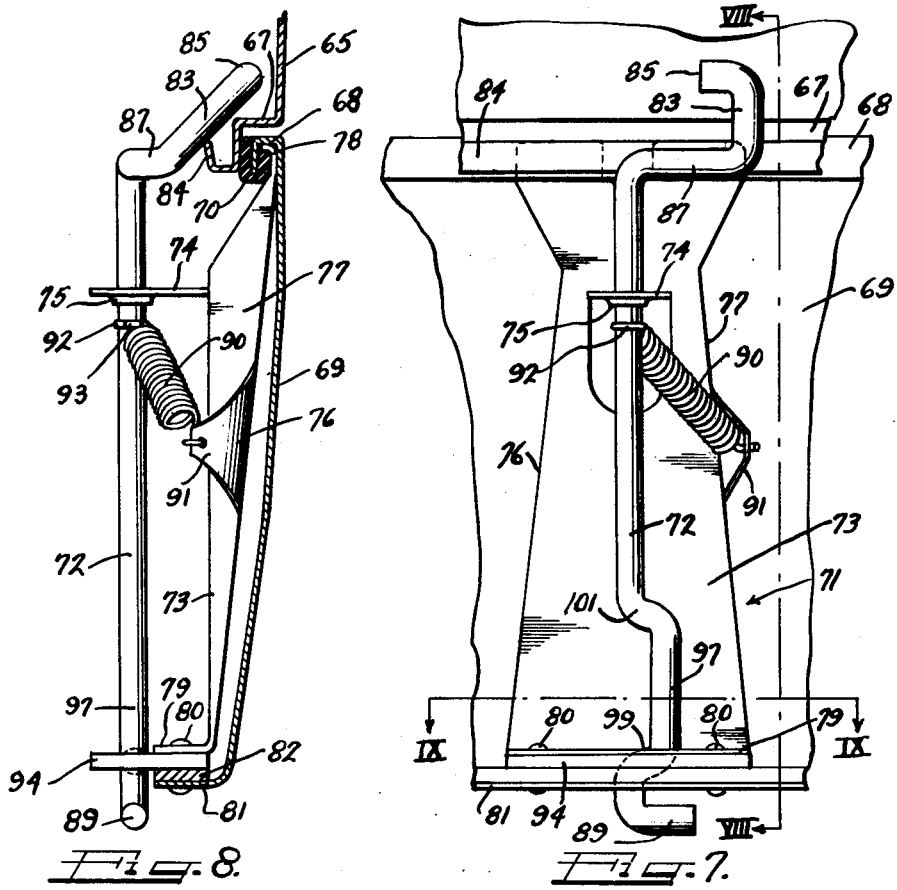
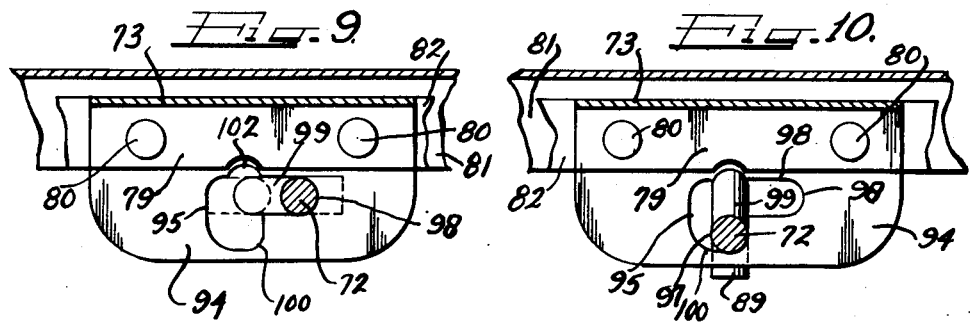

Patented July 15, 1952

2,603,514

UNITED STATES PATENT OFFICE 2,603,514

FENDER SHIELD ATTACHING MEANS

George W. Schatzman, Detroit, Mich., assignor to Houdaille-Hershey Corporation, Detroit, Mich., a corporation of Michigan Application October 24, 1946, Serial No. 705,372

16 Claims. (Cl. 292—129)

1

This invention relates to fender and fender skirt for shield constructions and more particularly to improved means therein and therefor comprising novel mechanism for attaching, clamping and latching the fender shield to the fender.

In the vehicle industry, and particularly in the automobile industry, various means have been utilized to improve the appearance of vehicle fenders. The usual vehicle fender is provided with an opening which affords access to the vehicle wheel, and which permits the ready removal or replacement of the wheel in an axial direction. Since this opening inherently presents an unattractive outward appearance, detachable fender shields have been employed to substantially cover the opening ornamentally.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly away from the principal body portion of the vehicle.

An important object of the present invention is to provide a novel fender and fender shield construction in which the fender shield is secured to the fender in a novel manner.

Another object of the invention is to provide a novel fender shield construction which is economical to manufacture, which is rugged and reliable in use, and in which the fender shield may be readily and quickly attached to and detached from the vehicle fender.

A further object of the invention is to provide a fender shield carrying novel mechanism thereon for attaching the same to a fender.

Still another object of the invention is to provide a novel mechanism for detachably securing a fender shield to a vehicle fender.

A still further object of the invention is to provide improved mechanism for securing a fender shield in assembly with a fender and which mechanism can be easily and quickly manipulated for attachment or detachment purposes but which in service is locked against release from fender shield clamping and latching condition.

2

Yet another object of the invention is to provide fender shield attaching mechanism including a latching and clamping member which is normally biased toward non-latching position but is locked against release during service.

It is also an object of the invention to provide novel means in a fender and fender shield construction for locking the clamping and latching mechanism against unintentional displacement from latching and clamping relationship to a fender.

Other objects, features and advantages of the present invention will become readily apparent from the following detailed description of certain preferred embodiments thereof taken in conjunction with the accompanying three sheets of drawings in which:

Figure 1 is a side elevational view of a fender and fender shield combination according to the present invention;

Figure 2 is an enlarged, fragmentary, inside elevational view showing the fender shield and the immediately adjacent contacted portion of the fender;

Figure 3 is an enlarged, fragmentary inside elevational view of that portion of the fender and fender shield assembly and including the latching and clamping mechanism and showing the latter in the service condition thereof;

Figure 4 is a vertical sectional view taken substantially along the line IV—IV of Figure 3;

Figure 5 is a horizontal sectional view taken substantially along the line V—V of Figure 3 and on a slightly larger scale;

Figure 6 is an inside elevational view of that portion of the structure shown in Figure 5 and demonstrating how a wrench is applied thereto for actuating the latching and clamping mechanism;

Figure 7 is a fragmentary inside elevational view of a slightly modified form of fender and fender shield assembly showing a modified clamping and latching mechanism in its service condition;

Figure 8 is a vertical sectional view taken substantially along the line VIII—VIII of Figure 7;

Figure 9 is a horizontal sectional view taken substantially along the line IX—IX of Figure 7; and Figure 10 is a horizontal sectional view taken in substantially the same plane as Figure 9 but showing the latching and clamping mechanism in the open or non-latching position thereof.

In the exemplary form of the invention shown in Figures 1 to 6, inclusive, a vehicle fender 15 having a wheel opening 16 has assembled therewith a fender shield 17 in the form of a panel which pleasingly closes the opening.

The fender shield 17 is dimensioned to overlap the fender 15 about the opening 16, and hanger structures 18 and 19 (Figure 2) at the front and rear ends, respectively, of the fender shield support the lower edge thereof on the fender 15 in position to rock about a substantially horizontal axis into and out of marginal engagement with the fender. The front hanger structure 18 comprises a hanger arm 20 which is carried by a lower-edge reinforcing flange 21 on the fender shield 17 and extends beyond the forward end thereof to engage a supporting flange structure 22 on the adjacent lower edge of the fender. The rear hanger structure comprises an inwardly extending hanger finger 23 carried by the fender shield and engaging within a hanger bracket 24 carried by the fender. In assembling the fender shield 17 with the fender 15, the front and rear hanger structures 18 and 19 are first interengaged by suitable manipulation, the fender shield being held in an outwardly tilted relation to the fender. After the hanger structures have been interengaged, the fender shield is swung in toward the fender until the margins of the fender shield engage the margins of the fender about the wheel opening 16.

After assembly has been accomplished as just outlined, the attachment of the fender shield 17 to the fender 15 is completed by manipulation of a clamping and latching mechanism 25 which is preferably carried by the fender shield at approximately the rear center thereof and includes a latching and clamping member 27 engageable with an inturned marginal reinforcing flange 28 which defines the wheel access opening 16 in the fender and is preferably of substantially hook shaped cross-section.

According to the present invention, the clamping and latching member 27 is normally biased to assume an inactive position, as shown in dot-dash outline in Figure 4, wherein it fully clears the fender marginal flange 28 and thus permits the fender shield 17 to be swung about the horizontal hanger-bracket axis into and out of the assembled relation to the fender 15. However, the clamping and latching member 27 is adapted to be easily and conveniently manipulated from the inactive position into a full latching and clamping position wherein the fender shield 17 is held tightly clamped against the fender 15, as shown in full outline in Figure 4. Furthermore, the latching and clamping member 27 is of such construction that when the fender shield 17 is to be detached, it is temporarily supported, as shown in dash outline in Figure 4, in partially open or outwardly tilted position by the clamping and latching member so that the latter can be conveniently manipulated without any need for holding the fender shield against suddenly swinging all the way open or away from the fender 15 as an incident to release of the clamping and latching member.

This is accomplished by having the clamping and latching member 27 formed as a rod which is rotatably and longitudinally movably supported by a bracket structure 29 which is preferably in the form of a sheet metal plate vertically elongated and having a foot flange 30 secured in any suitable fashion as for example by means of rivets 31 to the top of a reinforcing bar 32 carried by the lower edge reinforcing flange 21 of the fender shield. At its upper end, the bracket plate 29 is formed with a curvate top flange 33 complementary to the upper curvate margin of the fender shield 17 and adapted to fit relatively snugly within the reentrant corner formed by a downturned marginal reinforcing flange 34 along the top edge of the fender shield. An anti-rattle cushion or gasket 35 of resilient material such as rubber may be carried by the fender shield flange 34. Longitudinal side flanges 37 on the bracket plate reinforce the same against bowing. Rotary and vertical bearing support for the upper end portion of the clamping and latching rod 27 is afforded by an inwardly right angular, struck-out bearing tongue or ear 38 in a horizontal plane centrally of the bracket plate 29 and having a bearing aperture 39 through which the rod 27 extends reciprocably and rotatably slidably. Thereby, the clamping and latching rod 27 is supported generally parallel to the inner face of the fender shield 17 and in the fully assembled relationship of the fender and fender shield extends vertically beneath the fender marginal flange 28.

For latching and clamping engagement of the fender marginal flange 28, the clamping and latching rod 27 is formed with a cam head 40 which in the present instance is provided by an integral upward and outwardly curved upper end portion of the clamping and latching member rod 27, considering this description as applying to the rod while in the clamping and latching service position thereof. The cam head 40 is joined to the body of the rod by an inward right angular offsetting arm portion 42 adapted to provide a downward movement limiting stop engageable with the top of the bearing ear 38 in the inactive non-latching position of the rod. By reason of the lateral arm 42, the cam head 40 is adapted to be swung into and out of camming relation to the flange 28 by rotation of the body of the rod 27. As shown, a right hand turn of the clamping and latching rod 27 carries the cam head 40 out of cammed clamping and latching relation to the flange 28 and a left hand turn effects the clamping and latching engagement.

Means for normally biasing the clamping and latching rod 27 toward the inactive position, shown in dot-dash outline in Figure 4, herein comprises a coiled expansion spring 43 which concentrically encircles the body of the clamping and latching rod 27 and bears at its upper end against the lower face of the bearing ear 38 while its lower end is in compression engagement with a washer 44 held in position by a transverse pin 45 extending through the rod 27 therebelow. The load or tension of the spring 43 is calculated to enable relatively easy compression of the spring by upward reciprocal movement of the clamping and latching rod 27 to carry the cam head 40 into clamping and latching relation to the flange 28 and when the cam head has been swung into tight clamping relation to the flange the compressed or loaded condition of the biasing spring 43 is, of course, maintained.

Means for turning the latching and clamping rod 27 may comprise a terminal member 47 carried by the lower end of the rod and which may be of hexagonal shape and adapted to be engaged by a suitable wrench 48 (Figure 6). Access to the terminal member 47 is afforded by having it disposed below the fender shield flange 21 while the lower end portion of the clamping and latching rod 27 extends through a bearing aperture 49 provided therefor in the reinforcing bar 32 and the contiguous portions of the flanges 21 and 30.

Since the action of the loaded biasing spring 43 normally tends to force the latching and clamping rod 27 reciprocably downwardly and back the clamping head 40 out of engagement with the flange 28, means are provided for locking the rod 27 against rotation during service, thereby holding the head 40 against swinging out of its clamping and latching position. In the present instance such means includes a detent type of interlock 50 engageable in an axially extending peripheral slot 51 in the lower terminal member 47. In a preferred form, the interlock 50 comprises a downwardly struck out tongue or finger integral with one end portion of an elongated spring plate 52 (Figures 3, 5 and 6), the aperture, identified at 53, formed by the striking out of the interlock 50 accommodating the clamping and latching rod 27 therethrough. The end portion of the spring plate 52 remote from the interlock 50 is secured, as by means of a rivet 54 to the combined fender flange 21 and reinforcing bar 32, a square washer 55 being interposed between the head of the rivet and the contiguous portion of the spring plate to afford a secure hold upon the spring plate. A slight upward offset 57 is formed in the spring plate 52 adjacent to the washer 55 in order to permit the body of the spring plate to ride flat upon the bracket foot flange 30, and an aperture 58 in the spring plate affords clearance for the head of the rivet 31 in the way of the spring plate.

As best shown in Figure 6, the detent 50 extends down through the rod-bearing aperture 49, which for this purpose is elongated longitudinally of the fender flange 21. The length of the detent is such that during the clamping and latching condition of the member 27 it normally extends well down into the terminal member slot 51 (see Figure 3) whereby to hold the member 47 and thereby the rod 27 against rotation.

To release the interlock 50, the wrench 48 is pressed against a right angular foot flange 59 at the lower end of the interlock by which the end of the wrench is adapted to force the interlock upwardly out of the slot 51, flexing the spring plate 52 and clearing the terminal member 47 for rotation. Longitudinal right angular reinforcing flanges 60 and 61 are provided on the side margins of the spring plate 52 to reinforce the same and maintain it substantially rigid throughout its major length and terminate short of the offset 57 so that the principal flexure of the plate occurs at or adjacent to the offset, thereby carrying the interlock 50 for movement on a relatively large radius when it is displaced from or returns automatically to the slot 51 in the flexure of the spring plate. A washer 62 may be interposed between the member 47 and the flange 21 to reduce frictional contact in the operation of the wrench 48, the washer being appropriately slotted complementary to the slot 51.

To avoid side play of the clamping and latching rod 27 due to the elongation of the aperture 49, the interlock 50 may be formed with a bowed shoulder 63 opposing and engageable slidably with the rod 27 for taking up the space or slack between the rod and the portion of the slot provided for operation of the interlock.

When the interlock 50 has been cleared from the interlock slot 51, and the terminal member 47 has been turned to release the cam head 40 from its clamping and latching relation to the fender flange 28, the biasing spring 43 acts to push the clamping and latching rod 27 downwardly until an upper terminal end portion or retaining hook 64 on the cam head 40 engages the inner edge of the flange 28, thereby permitting the fender shield 17 to swing outwardly a limited distance but holding it against full displacement, substantially as shown in the dash outline position in Figure 4. Then, in order to release the retaining hook 64 from the flange 28, the fender shield 17 is pushed back toward the fender 15 and the hook is carried inwardly clear of the flange 28. The biasing spring 43 thereupon causes the clamping and latching rod 27 to snap downwardly and entirely clears the retaining hook 64 and the head 40 below the flange 28, as shown in dot-dash outline in Figure 4. The fender shield 17 may then be swung outwardly and released from the hanger structures 18 and 19.

Replacement of the fender shield 17 is simply a reversal of the removal process, entailing merely interengagement of the hanger structures 18 and 19 and swinging of the fender shield into the assembled relationship with the fender 15, whereupon upward manipulation of the clamping and latching rod 27 in opposition to the biasing spring 43 and engagement of the retaining hook 64 upon the fender flange 28 will retain the fender shield in position to enable free manipulation of the wrench 48 for turning the terminal member 47 until the clamping and latching rod carries the cam head 40 into clamping and latching relation to the flange 28. This effects registration of the interlock slot 51 in the terminal member with the interlock 50 so that when the wrench 48 is withdrawn the interlock 50 follows it into the slot and holds the member 47 against rod-releasing rotation.

In the modified form of the invention shown in Figures 8 to 10, inclusive, substantially the same results are attained without the use of a spring plate interlock, but the construction and arrangement is such that a direct interlocking relationship is effected between the clamping and latching member and the supporting structure therefor. In this modified construction, moreover, a fender 65 is formed with an inwardly offset flange 67 of substantially rabbet groove formation adapted to receive an angular return bent upper marginal flange 68 on a fender shield 69 which is thereby adapted to lie in substantially flush relationship to the outer face of the fender 65. An anti-rattle gasket 70 is suitably carried by the flange 68.

After the fender shield 69 has been preliminarily assembled with the fender 65 by any preferred expedient enabling the fender shield to be rocked about a horizontal axis into fully assembled relationship, such, for example, as by means of end hanger structures on the order of those already described in connection with the form of the invention shown in Figure 1 and more particularly illustrated in Figure 2, a latching and clamping mechanism 71, which operates on the same principles as the latching and clamping mechanism 25, is brought into play for latching and clamping the fender shield in place. To this end, the latching and clamping mechanism 71 comprises a latching and clamping member in the form of a generally vertical rod 72 supported by a vertically elongated bracket plate 73 formed with an inwardly struck out horizontal bearing ear 74 adjacent to its upper end and which is formed with an appropriate aperture and bearing flange 75 for longitudinally rotatably slidably supporting the upper end portion of the rod 72. Longitudinal side flanges 76 and 77 reinforce the bracket plate 73 against bowing and the upper end of the bracket plate is formed with an engagement flange 78 which is secured within the channel formed by the upper marginal flange 68 on the fender shield 69. At its lower end, the bracket plate 73 is formed with an inwardly extending foot flange 79 by which it is secured as by means of rivets 80 to a lower marginal inwardly extending reinforcing flange 81 on the fender shield and which may be further rigidified and reinforced by an interposed bar 82.

At its upper end, the latching and clamping rod 72 is formed with a cam head 83 engageable in clamping and latching relation with an upturned marginal portion 84 of the fender flange 67. A hook terminal 85 on the head 83 is adapted to engage with the flange portion 84 for retaining the fender shield at an intermediate stage in assembly or disassembly, in substantially the same manner as described in connection with the hook terminal 64 in the previously described form of the invention. The cam head 83 is connected to the body of the rod 72 by means of integral right angularly related offsetting bend 87 whereby the head is adapted to be swung into and out of latching and clamping camming relation to the flange portion 84 by rotation of the rod 72 which may be effected by manipulation of a right angularly extending handle terminal portion 89 at the lower end of the rod 72. The terminal portion 89 preferably extends below the lower marginal flange 81 of the fender shield 69 for convenient access.

The clamping and latching rod 72 is normally biased downwardly by means such as a coiled expansible tension spring 90, one end of which is fixedly anchored to a rearwardly extending anchoring ear 91 deformed from the reinforcing flange 77 while the opposite end is in the form of a terminal loop 92 anchored within an annular groove 93 in the rod 72 and disposed at a substantial elevation above the point of anchorage to the ear 91. Thereby, with the biasing spring 90 maintained under tension, it normally acts to draw the rod 72 downwardly.

In addition to drawing the rod 72 downwardly, the biasing spring 90 is so mounted that it draws the rod laterally and outwardly whereby to bias the lower portion thereof normally into interlocking relation with an interlock plate 94. This plate is preferably in the form of a flat member interposed between the foot flange 79 and the top of the reinforcing bar 82 and secured in place by the rivets 80. The interlock plate 94 extends inwardly substantially beyond the edge of the foot flange 79 and the fender flange 81 into intersecting relation to the lower end portion of the latching and clamping rod 72 and is formed with an interlock and guide aperture 95 through which the rod extends.

The lower end portion of the latching and clamping rod 72 is formed with an offset portion 97 providing an interlock operative within the aperture 95 and preferably lying in the plane of the handle terminal 89, which is substantially at right angles to the vertical plane of the cam head 83 and extending in the general direction of the lateral bias afforded by the spring 90. Thereby, in the latching and clamping position of the head 83, the interlock offset 97 is urged into an interlocking lateral extension slot 98 provided for this purpose at the side of the aperture 95 and so related to the offset 97 that in the full clamping relation of the head 83, the lower offsetting bend, identified at 99, is interlockingly engaged between the longitudinal walls of the slot 98. This holds the rod 72 against rotation out of the clamping and latching position.

To release the interlock bend 99 from the slot 98, the handle terminal 89 is engaged and the rod 72 swung laterally until interlock offset 97 is clear of the slot 98, as shown in broken outline in Figure 9, the aperture 95 being formed of sufficient width for this purpose. Then the rod 72 is adapted to be turned to carry the interlock offset 97 into an outward turn-extension 100 of the aperture 95 substantially as shown in Figure 10 which carries the cam head 83 ninety degrees around into non-latching relation to the flange 84 and positions the hook 85 for engagement with the flange 84 as the biasing spring 90 pulls the rod 72 downwardly. At the same time, the biasing spring 90 draws the rod 72 laterally and the interlock offset 97 engages the adjacent side of the aperture 95 whereby the rod 72 is held substantially against further turning. When the retaining hook 85 is released from the flange 84 by swinging the fender 69 inwardly and clearing the hook terminal 85, the spring 90 acts to snap the rod 72 downwardly until the hook terminal is disposed below the flange 84 and the offsetting arm 87 comes to rest upon bearing tongue 74. At the same time, an upper offsetting shoulder bend 101 at the upper end of the interlock offset 97 in rod 72 comes to rest within a clearance notch 102 at the inner side of the aperture 95 and holds the rod against promiscuous swinging. This is of advantage when the fender shield 69 is laid down on its back, since thereby the head 80 provides a rest for engagement of the surface upon which the fender shield is laid thus saving the ear 74 and possibly other structure from possible bending damage.

In applying the fender shield 69 to the fender 65, the end-supporting bracket structures are first interengaged and the fender shield is then swung up into assembled relation with the fender whereupon the clamping and latching rod 72 is pushed upwardly in opposition to the bias of the spring 90 until the head 83 is in position to enter into clamping relation with the flange 84. The rod 72 is then turned 90° until clamping and latching relationship has been effected whereupon the biasing spring 90 draws the interlock 97 automatically into the interlock slot 98 and the latched and clamped relationship of the structure is maintained until intentional release is effected.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in latching and clamping means for a fender shield, a reciprocable and rotary rod, means for supporting and guiding said rod, said rod having a clamping head thereon, means acting upon said rod normally biasing the same out of the latching and clamping position thereof, said clamping head being movable into the latching and clamping position by rotation of the rod, and means partially on the rod and including an interlock element and a slotted element in which the interlock element is engageable for locking the rod against rotation out of the latching and clamping position and thus preventing said biasing means from acting.

2. In combination in latching and clamping mechanism for a fender shield, a supporting structure, a vertically reciprocable and rotatable latching and clamping rod carried by said supporting structure, a latching and clamping head at the upper end of said rod adapted to be moved vertically and rotatably into latching and clamping position with respect to a fender the access opening of which the fender shield is adapted to close, means normally biasing the rod out of the latching and clamping position, means at the lower end of said rod for manipulating the rod reciprocably and rotatably, and a member past which the lower portion of the rod passes in intersecting relation, said member and said lower portion of the rod having interengaging interlock means disposed at the intersection of the rod and member for holding the rod against unintentional turning out of the latching and clamping position thereof.

3. In combination in a fender shield latching and clamping mechanism including a supporting structure, a vertically reciprocable and rotatable latching and clamping rod carried by said supporting structure, a latching and clamping head at the upper end of said rod adapted to be moved vertically and rotatably into latching and clamping position with respect to a fender the access opening of which the fender shield is adapted to close, means normally biasing the latching and clamping rod downwardly out of the latching and clamping position, means at the lower end of said rod for manipulating the rod reciprocably and rotatably, an apertured interlock plate extending inwardly from the fender shield and intersecting the axis of the latching and clamping rod, said latching and clamping rod extending through said interlock plate and having an interlock portion thereon engageable with the interlock plate in the latching and clamping position of the rod to hold the rod against unintentional turning out of such position.

4. In combination in vertical latching and clamping mechanism for a fender shield, a rotary latching and clamping rod having a wrench engageable member at the lower end thereof, a spring interlock engageable with said member and including a leaf spring adapted to be flexed out of interlocking relation to said member by application of a wrench to said member for turning said rod.

5. In combination in latching and clamping mechanism for a fender shield, supporting structure, a latching and clamping rod reciprocably rotatably supported by said supporting structure, an interlock plate having an aperture therethrough, said rod extending through said aperture, an interlocking offset on said rod, an interlock slot opening into said aperture and adapted to receive said interlock offset in the full clamping and latching position of the rod, and a biasing spring acting upon said rod normally to hold it in the interlocked position within said interlock slot.

6. In combination in a fender and fender shield, latching and clamping mechanism including a latching and clamping member having a latching and clamping head formed with a cam portion movable into latching and clamping relation to a flange defining a wheel access opening in a fender, means normally biasing said latching and clamping member out of said latching and clamping relation of the head to said flange, a retaining hook portion on said head movable into engagement with said flange in the initial release of the head from the latching and clamping position by movement of said cam portion away from said flange and movement of the head partially toward non-clamping position under the influence of said biasing means, said biasing means being adapted when said hook portion is released from said flange to draw the latching and clamping head and said hook portion clear of said flange, and means for supporting the latching and clamping member in the fully released position.

7. In combination in a fender and fender shield latching and clamping mechanism including supporting structure, a rotary and reciprocable latching and clamping member carried by the supporting structure and having a latching and clamping head formed with a cam portion movable by rotation and rectilinear movement into latching and clamping relation to a flange defining a wheel access opening in a fender with which the fender shield is adapted to be associated, means normally biasing said latching and clamping member rectilinearly out of said latching and clamping relation of the head to said flange, a retaining hook on said head movable into engagement with said flange in the initial release of the head from the latching and clamping position by movement of said cam portion away from said flange and movement of the head partially toward non-clamping position under the influence of said biasing means, said biasing means being adapted when said hook is released from said flange to draw the latching and clamping head and said hook clear of said flange, means for supporting the latching and clamping member in the fully released position, an interlock structure including means on the latching and clamping member and coacting means associated with the supporting structure operative for holding said latching and clamping member against rotation from the latching and clamping position of said head with respect to said flange.

8. In a fender shield latching mechanism adapted to be supported by a fender shield for securing the same in closing relation to a wheel access opening in a fender, the latching and clamping mechanism being adapted for engaging behind a marginal flange structure defining the wheel access opening for clamping the fender shield in position on the fender, the latching and clamping mechanism comprising a vertically extending bracket member adapted to be secured in position at the back of the fender shield and including a foot flange extending inwardly when in position on the fender shield, a rectilinearly and rotatably movable latching and clamping element, means adjacent the upper portion of said bracket for rectilinearly and rotatably guiding said latching and clamping element, said element having a latching and clamping head at the upper terminus thereof and means at the lower terminus for engagement to manipulate the same reciprocably and rotatably to swing said latching and clamping head into and out of latching and clamping position with respect to the fender, means connected to said latching and clamping element and having engagement with said bracket for normally biasing the latching and clamping element in a downward direction tending to move it out of the latching and clamping position, the construction and arrangement of said latching and clamping head being such that when in the latching and clamping position relative to the fender it resists downward movement and must be rotated out of the latching and clamping position in order to move downwardly, said latching and clamping element having a lower portion thereof adjacent said flange, and means at said foot flange and cooperating with said lower portion of said element for holding said element releasably against rotation out of the latching and clamping position.

9. A latching and clamping structure as defined in claim 8 in which the releasable holding means comprises a resilient detent structure cooperative with said engagement means at the lower end portion of the latching and clamping member.

10. A latching and clamping structure as defined in claim 8 wherein the releasable holding means comprises a member serving as a vertical guide for the clamping and latching element and the latching and clamping element has an intermediate portion interlockingly engageable with said guiding member for holding the latching and clamping element against rotation.

11. A latching and clamping structure as defined in claim 8 wherein the biasing means comprises a tension spring having one end thereof attached to the latching and clamping element and the other end thereof disposed adjacent to one side of the supporting bracket, and the supporting bracket includes a rearwardly extending ear to which the adjacent end of the spring is attached under tension.

12. In combination in latching and clamping mechanism for a fender shield, a vertically disposed rotary latching and clamping rod having a wrench-engageable member at the lower end thereof, said wrench-engageable member having a vertically extending notch therein, and a leaf spring mounted fixedly at one end adjacent to said latching and clamping rod on an axis transverse to the rod and having an end portion overlying said wrench-engageable member, said leaf spring having an interlock finger extending downwardly therefrom and engaging as a rotation preventing detent in said notch, said leaf spring being adapted to be flexed upwardly upon application of a wrench to said member and upward force against said interlock finger to displace the interlock finger from said notch.

13. In combination in latching and clamping structure for a fender shield, a vertical bracket member, a vertically reciprocable and rotary latching and clamping rod, said bracket member having means affording bearing and guide for the rod, an ear extending inwardly from the bracket, and a tension spring connected at one end to said ear and at the other end to said rod and normally acting to bias the rod in one direction.

14. In combination in a fender shield latching and clamping structure, an elongated bracket, a rotary and reciprocable latching member supported by said bracket, said member having a limited range of lateral movement at one end, and a biasing spring connected between said member and the bracket at one side of the member and biasing the member both longitudinally and laterally.

15. For use in a fender shield assembly, a clamping and latching rod to be mounted at the inner side of a fender shield panel, means for supporting the rod for rotary and reciprocable movements, said rod having a vertically extending body portion with manipulating means at the lower end of the body portion and a clamping head on the upper end of the body portion; said clamping head being adapted to be operatively located adjacent to the upper margin of the fender shield panel and comprising a portion extending laterally from the body of the rod, another portion extending upwardly and at an angle to the extremity of said lateral portion, and a terminal portion extending in reverse direction to said lateral portion generally toward the body portion whereby to afford a substantially open loop hook-shape for said head; said terminal portion being in substantially spaced relation to said lateral portion; said rod being guided by said supporting means for vertical movement to carry said head from a position wherein the upwardly extending portion and terminal portion are generally opposite the upper edge of the fender shield panel to a position where they are depressed substantially below said upper edge whereby in the upper position of the head it is adapted to make clamping engagement with the margin of a fender with which the fender shield may be assembled, and in the depressed position the head clears said margin of the fender in the mounting or dismounting of the fender shield; said terminal portion being engageable in an intermediate position between the upper and depressed positions of the head with an inwardly extending marginal flange on the fender for holding the fender shield in an interim partially open position.

16. In combination, supporting means, a latching and clamping member carried by said supporting means and adapted to be manipulated into latching and clamping position, said member being rotatable, interlock structure carried by said member, and an interlock bar having interlock notches therein operatively located adjacent to said interlock structure, said interlock structure being engageable selectively in said notches for maintaining said member non-rotatable in any selected one of a plurality of positions to which it may be rotated.

GEORGE W. SCHATZMAN.

REFERENCES CITED

The following references are of record in the file of this patent:

UNITED STATES PATENTS

| Number | Name | Date |
|---|---|---|
| 167,624 | Share | Sept. 14, 1875 |
| 1,064,313 | Garlock | June 10, 1913 |
| 1,548,907 | Schweim | Aug. 11, 1925 |
| 2,113,753 | Wilson | Apr. 12, 1938 |
| 2,334,867 | Fergueson | Nov. 23, 1943 |

FOREIGN PATENTS

| Number | Country | Date |
|---|---|---|
| 284,258 | Great Britain | Sept. 6, 1928 |